(12) United States Patent
Kim et al.

(10) Patent No.: US 8,559,829 B2
(45) Date of Patent: Oct. 15, 2013

(54) FLEXIBLE MULTI-BAND MULTI-TRAFFIC OPTICAL OFDM NETWORK

(75) Inventors: Inwoong Kim, Allen, TX (US); Paparao Palacharla, Richardson, TX (US); Xi Wang, Murphy, TX (US); Motoyoshi Sekiya, Richardson, TX (US)

(73) Assignee: Fujitsu Limited, Kawasaki-shi (JP)

( * ) Notice: Subject to any disclaimer, the term of this patent is extended or adjusted under 35 U.S.C. 154(b) by 0 days.

(21) Appl. No.: 13/176,643

(22) Filed: Jul. 5, 2011

(65) Prior Publication Data

US 2013/0011138 A1 Jan. 10, 2013

(51) Int. Cl.
*H04B 10/06* (2011.01)
*H04J 14/00* (2006.01)

(52) U.S. Cl.
USPC .............. 398/208; 398/76; 398/202; 398/203

(58) Field of Classification Search
USPC ........................................... 398/76, 202–214
See application file for complete search history.

(56) References Cited

U.S. PATENT DOCUMENTS

| 2009/0074415 A1* | 3/2009 | Xie .................................. 398/79 |
| 2010/0142951 A1* | 6/2010 | Armstrong et al. .............. 398/65 |
| 2011/0222854 A1* | 9/2011 | Roberts et al. .................. 398/70 |

OTHER PUBLICATIONS

Shieh et al.; "Coherent Optical OFDM: Theory and Design"; Optics Express, vol. 16, No. 2; pp. 19, Jan. 21, 2008.
Shieh et al.; "Coherent Optical Orthogonal Frequency Division Multiplexing"; Electonics Letters, vol. 42, No. 10; pp. 2, May 11, 2006.
Buchali et al.; "Towards Real-Time CO-OFDM Transceivers"; Optical Society of America; pp. 4, 2010.
Gavioli et al.; "Investigation of the Impact of Ultra-Narrow Carrier Spacing on the Transmission of a 10-Carrier 1Tb/s Superchannel"; Optical Society of America; pp. 3, 2008.
Chandrasekhar et al.; "Transmission of a 1.2-Tb/s 24-Carrier No-Guard-Interval Coherent OFDM Superchannel Over 7200-km of Ultra-Large-Area Fiber"; ECOC 2009; pp. 2, 2009.
Dischler et al.; "Experimental Studies of Polarization-Multiplexed Optical OFDM Superchannel Transport"; 2010 IEEE; pp. 2, 2010.

* cited by examiner

*Primary Examiner* — Danny Leung
*Assistant Examiner* — Daniel Dobson
(74) *Attorney, Agent, or Firm* — Baker Botts L.L.P.

(57) ABSTRACT

In accordance with some embodiments of the present disclosure a method for receiving and processing an optical orthogonal frequency-division multiplexed signal containing a plurality of traffics comprises receiving the optical orthogonal frequency-division multiplexed signal. The method further comprises down-converting the optical orthogonal frequency-division multiplexed signal into the electrical domain to obtain an electrical signal; filtering the electrical signal to obtain a first portion of the electrical signal containing a first of the plurality of traffics and preprocessing the first portion of the electrical signal in a first parallel preprocessor; filtering the electrical signal to obtain a second portion of the electrical signal containing a second of the plurality of traffics and preprocessing the second portion of the electrical signal in a second parallel preprocessor; and combining the preprocessed first and second portions of the electrical signal to yield a combined electrical signal and demodulating the combined electrical signal.

14 Claims, 8 Drawing Sheets

FLEXIBLE MULTI-BAND MULTI-TRAFFIC OPTICAL OFDM NETWORK

TECHNICAL FIELD OF THE DISCLOSURE

The present invention relates generally to optical networks, more particularly, to a flexible multi-band multi-traffic optical orthogonal frequency-division multiplexing network.

BACKGROUND

A communication network allows nodes to communicate with other nodes. A communication network may comprise all or a portion of one or more of the following: a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, other suitable communication link, or any combination of any of the proceeding. A communication network may comprise an Optical Transport Network (OTN).

Information may be transmitted and received through an optical network by modulation of one or more wavelengths of light to encode the information on the wavelength. In optical networking, a wavelength of light may also be referred to as a channel. Each channel may be configured to carry a certain amount of information through an optical network.

To increase the information carrying capabilities of an optical network, multiple signals transmitted at multiple channels may be combined into a single optical signal. The process of communicating information at multiple channels of a single optical signal is referred to in optics as wavelength division multiplexing (WDM). Without some form of WDM, the bandwidth in optical networks may be limited to the bit-rate of solely one wavelength. With more bandwidth, optical networks are capable of transmitting greater amounts of information.

The transmission of multiple traffic streams may result in inefficient use of network resources when the individual traffic bandwidth is less than the bandwidth of the transmitters and receivers in the network. In that case, each transmitter and receiver will have excess, unused bandwidth.

SUMMARY

In accordance with some embodiments of the present disclosure a method for receiving and processing an optical orthogonal frequency-division multiplexed signal containing a plurality of traffics comprises receiving the optical orthogonal frequency-division multiplexed signal. The method further comprises down-converting the optical orthogonal frequency-division multiplexed signal into the electrical domain to obtain an electrical signal. The method additionally comprises filtering the electrical orthogonal frequency-division multiplexed signal to obtain a first portion of the electrical signal containing a first of the plurality of traffics and preprocessing the first portion of the electrical signal in a first parallel preprocessor. The method additionally comprises filtering the electrical signal to obtain a second portion of the electrical signal containing a second of the plurality of traffics and preprocessing the second portion of the electrical signal in a second parallel preprocessor. The method further comprises combining the preprocessed first portion of the electrical signal and the preprocessed second portion of the electrical signal to yield a combined electrical signal and demodulating the combined electrical signal. The method may provide that a later-arriving traffic does not interrupt the reception and/or processing of an earlier-arriving traffic.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION

Figure 1:
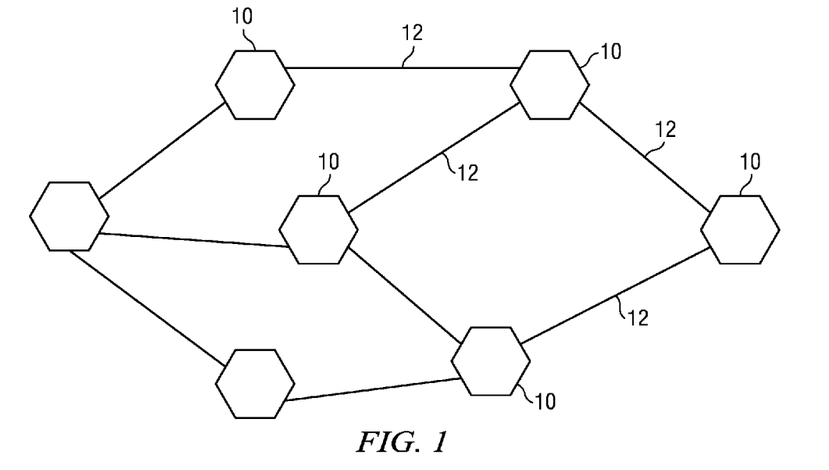
FIG. 1 is a simplified diagram of a communication network.

FIG. 1 is a simplified diagram of a communication network 1. A communication network may include nodes 10 and links 12 that facilitate communication between nodes 10 within the network 1. A communication network may comprise all or a portion of one or more of the following: a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, other suitable communication link, or any combination of any of the proceeding.

In some embodiments, communication network 1 may comprise an optical network such as an Optical Transport Network (OTN). Traffic may be transmitted between nodes 10 within an OTN according to various protocols such as ITU G.709. Nodes 10 may transmit traffic in data packets or frames known as Optical Transport Unit (OTU) frames. The nodes 10 may be, for example, central offices (CO) in a core OTN.

A node 10 will generally contain optical networking equipment and electrical circuitry permitting the node 10 to transmit optical signals, receive optical signals, and pass optical signals between adjacent nodes 10. Such equipment and circuitry may include, for example, one or more receivers, transmitters, and optical and/or electrical switches, along with electronics necessary to process electrical signals.

An example of an optical switch that may be included in a node 10 is a wavelength-selective switch (WSS). A WSS may reside, for instance, in transmitting nodes, receiving nodes and intermediate nodes. A WSS in a transmitting node may take input traffic from the transmitter and direct it to the next node in the traffic's route through the network. A WSS in an intermediate node may direct incoming traffic to the next node on the traffic's route. In a receiving node, a WSS may route incoming traffic to the receiver.

A link 12 may describe the communicative connection between two adjacent nodes 10. A link 12 may be a physical or logical connection between adjacent nodes. A physical link may include the transmission media, such as an optical fiber, a T1 cable, a WiFi signal, a Bluetooth signal, or any other suitable medium, that couples adjacent nodes 10 to each other.

Traffic may be information transmitted, stored, or sorted within the communication network. Such traffic may be communicated by means of optical or electrical signals configured to encode audio, video, textual, or any other suitable data. The data may also be real-time or non-real-time. Traffic may be communicated via any suitable communications protocol, including, without limitation, the Open Systems Interconnection (OSI) standard and Internet Protocol (IP). Additionally, traffic may be structured in any appropriate manner including, but not limited to, being structured in frames, packets, or an unstructured bit stream.

Traffic may be transmitted and received through network 1 by modulation of one or more wavelengths of light to encode the information on the wavelength. In optical networking, a wavelength of light may also be referred to as a channel. Each channel may be configured to carry a certain amount of information through network 1.

To increase the information carrying capabilities of communication network 1, multiple signals transmitted at multiple channels may be combined into a single optical signal. The process of communicating information at multiple channels of a single optical signal is referred to in optics as wavelength division multiplexing (WDM). Without some form of WDM, the bandwidth in optical networks may be limited to the bit-rate of solely one wavelength. With more bandwidth, optical networks are capable of transmitting greater amounts of information.

Communication network 1 may utilize a particular variation of WDM known as orthogonal frequency-division multiplexing (OFDM), which communicates traffic on one or more channels each having multiple orthogonal subcarrier frequencies. OFDM may be used in wireless communications as well as in optical networks. One example of an optical OFDM is the coherent optical OFDM ("CO-OFDM"), described in W. Shieh et al., "Coherent optical OFDM: theory and design," *Optics Express*, vol. 16, no. 2, Jan. 21, 2008. Optical OFDM conveys many advantages over other methods for WDM. For example, in an optical OFDM system, chromatic dispersion and polarization mode dispersion of the transmission system may be estimated and mitigated. Furthermore, optical OFDM results in high optical spectral efficiency compared to other WDM methods, reduces the necessary electrical domain bandwidth, and allows the use of efficient Fast Fourier Transform (FFT) and Inverse Fast Fourier Transform (IFFT) algorithms in signal processing. Finally, because OFDM signals include a guard interval and cyclic prefix, OFDM is more resistant to the effects of dispersion.

As discussed in W. Shieh et al., "Coherent optical OFDM: theory and design," *Optics Express*, vol. 16, no. 2, Jan. 21, 2008, an optical OFDM network may generally be understood to include at least five functional blocks: (1) a radio-frequency (RF) OFDM transmitter, (2) an RF-to-optical up-converter, (3) an optical channel, (4) an optical-to-RF down-converter, and (5) an RF receiver. An optical OFDM transmitter, which can include blocks (1) and (2), converts input electrical OFDM signals into optical OFDM signals for transmission on the optical channel. An optical OFDM receiver, which can include blocks (4) and (5), receives input optical OFDM signals from the optical channel and converts the signals into electrical OFDM signals.

Figure 2:
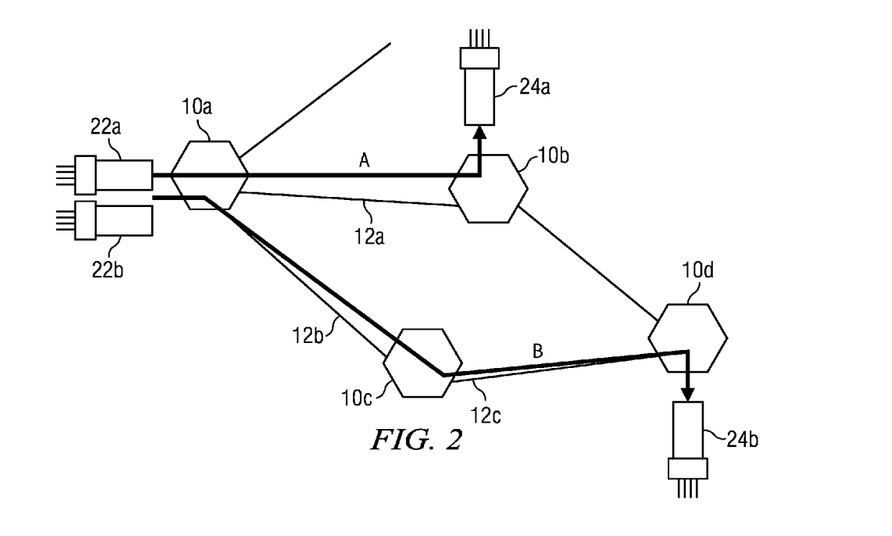
FIG. 2 depicts the transmission and reception of signals over a communication network.

FIG. 2 depicts the transmission and reception of optical signals over the network 1. An optical transmitter 22a residing in node 10a transmits an optical signal containing traffic A from node 10a to node 10b, where the signal is received by optical receiver 24a. Similarly, optical transmitter 22b residing in node 10a transmits an optical signal containing traffic B from node 10a, through node 10c and to node 10d, where the signal is received by receiver 24b.

The transmission depicted in FIG. 2 may result in inefficient use of network resources if, for example, the collective bandwidth of traffics A and B is less than the bandwidth of the transmitters. In that case, transmitters 22a and 22b each have excess, unused bandwidth. If the combined bandwidth of traffics A and B is less than or equal to the bandwidth provided by either of the transmitters 22a and 22b, it would be advantageous to use only one transmitter to transmit both traffics A and B.

Optical OFDM provides one way to transmit or receive multiple traffics with a single transmitter or receiver. Until now, several technical hurdles have prevented the efficient use of optical OFDM transmitters and receivers for sending or receiving multiple traffics to and from different locations in an optical network. These technical difficulties include, for example, the tendency for the center frequency to drift in the WSS filter and transmitter laser. This drift is particularly significant in the optical domain, and may be on the order of gigahertz. In addition, the WSS filter characteristic typically does not drop off in step-wise fashion but, instead, exhibits a finite slope at the band cut-off frequencies.

Figure 3A:
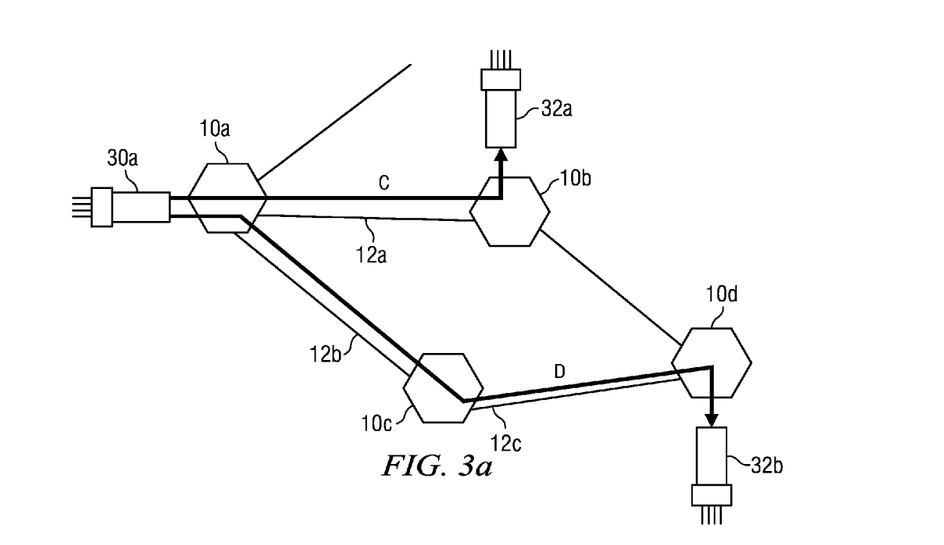
FIGS. 3a and 3b depict transmission of multiple optical orthogonal frequency division multiplexed signals by one transmitter according to an embodiment of the present disclosure.
Figure 3B:
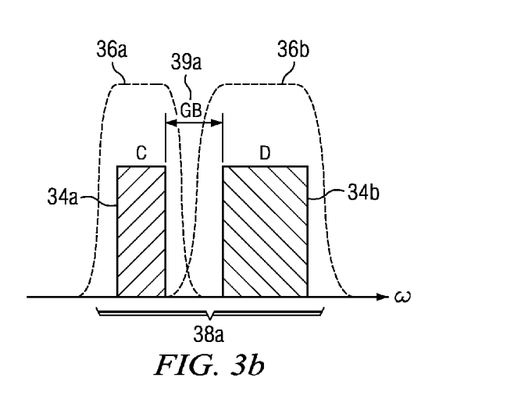

FIGS. 3a and 3b depict transmission of optical OFDM signals containing multiple traffics by one transmitter according to an embodiment of the present disclosure. FIG. 3a illustrates a multi-band, multi-traffic optical OFDM transmitter 30a that overcomes the technical difficulties discussed above. OFDM transmitter 30a is capable of transmitting optical OFDM signals containing both traffic C and traffic D, thus enabling a more efficient use of network resources. The optical OFDM signals containing traffic C and traffic D may be created by up-converting input RF-domain OFDM signals containing traffic C and traffic D to the appropriate optical frequencies. Transmitter 30a residing in node 10a transmits traffic C to receiver 32a residing in node 10b. While transmitting traffic C, transmitter 30a also transmits traffic D to receiver 32b residing in node 10d. Because transmitter 30a can transmit optical signals containing both traffic C and traffic D, it is unnecessary to assign traffic D to another transmitter. As a result, the network's resources may be more efficiently allocated.

FIG. 3b further illustrates that the bandwidth 34a of traffic C and the bandwidth 34b of traffic D are each less than the bandwidth 38a of transmitter 30a. In other words, traffic C and traffic D each use only fractional bandwidth of the transmitter 30a. Additionally, the collective bandwidth of traffics C and D, plus a suitable guard-band 39a, is within the bandwidth 38a of the transmitter 30a. In particular embodiments, the width of guard-band 39a is greater than the maximum relative frequency drift between the transmitter laser and the center of the bandwidth of the WSS filters used in the network plus two times the transition width of the WSS filter characteristics 36a and 36b. Guard-band 39a can be achieved by padding corresponding sub-carrier channel data with zeros in the OFDM transmitter.

Figure 4A:
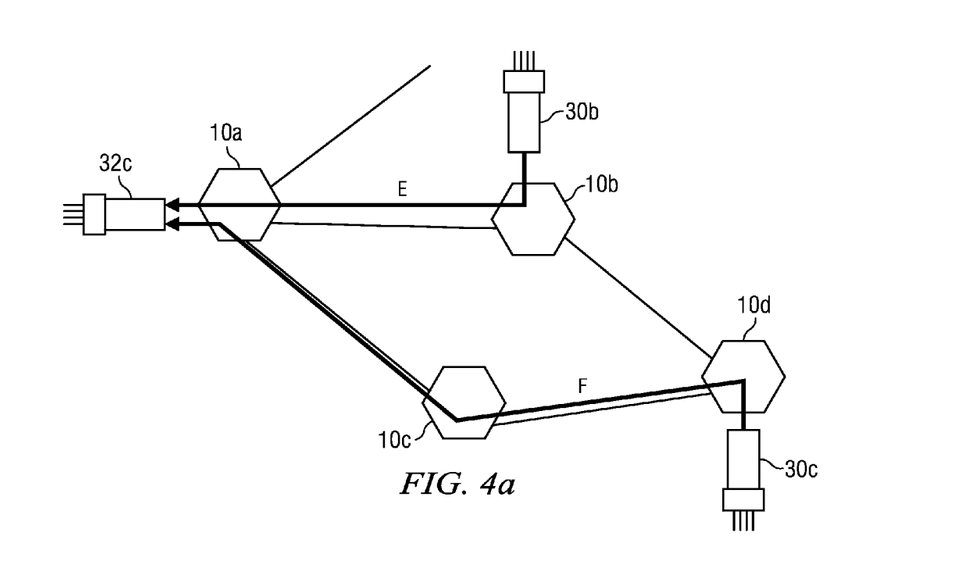
FIGS. 4a and 4b depict receipt of multiple optical orthogonal frequency division multiplexed signals by one receiver according to an embodiment of the present disclosure.
Figure 4B:
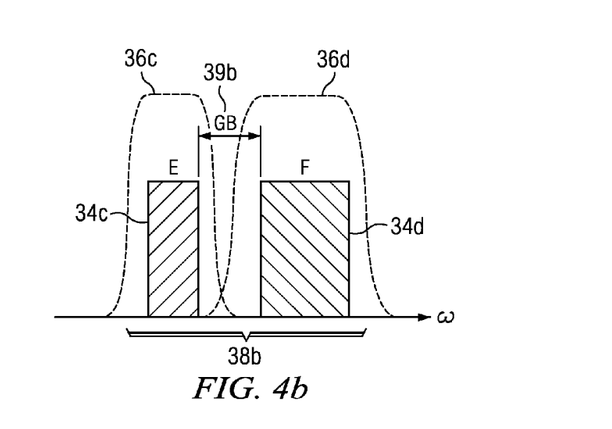

FIGS. 4a and 4b depict receipt of multiple optical OFDM signals by one receiver 32c according to an embodiment of the present disclosure. FIG. 4a illustrates a multi-band, multi-traffic optical OFDM receiver 32c that overcomes the technical difficulties associated with receiving multiple traffics from different locations in an optical network. Receiver 32c residing in node 10a receives an optical OFDM signal containing traffic E from transmitter 30b residing in node 10b. While receiving traffic E, receiver 32c also receives an optical OFDM signal containing traffic F from transmitter 38b residing in node 10d. Because receiver 32c can receive both traffic E and traffic F, it is unnecessary to assign traffic F to another receiver. Thus, receiver 32c's capability to receive multiple traffics allows more efficient use of network resources.

FIG. 4b further illustrates that the bandwidth 34c of traffic E and the bandwidth 34d of traffic F are each less than the bandwidth 38b of receiver 32c. In other words, traffic E and traffic F each use only fractional bandwidth of the receiver 32c. Additionally, the collective bandwidth of traffics E and F, plus a suitable guard-band 39b, is within the bandwidth 38b of the receiver 32c.

The guard-band ensures that linear cross-talk between bands is limited or negligible, thus making it possible to design receiver 32c such that new signal traffic does not interrupt the reception of existing traffic. As described above, the width of the guard-band 39b is typically greater than the maximum relative frequency drift between the transmitter laser and the center of the WSS filter bandwidth, plus two times the transition width of the WSS filter characteristics 36c and 36d.

In some circumstances, the orthogonality and symbol synchronization between traffic E and traffic F shown in FIGS. 4a and 4b may not be guaranteed in the optical domain. Nevertheless, because of the inclusion of the guard-band 39b, traffic E and traffic F may be separable in the electrical domain using, for example, an electrical filter. Because of frequency drift, traffic E and traffic F may not be orthogonal in the electrical domain after down-conversion from the optical domain. As described in further detail with respect to FIGS. 7 and 8, a preprocessor may be used to make traffic E and traffic F orthogonal to each other in the electrical domain by, for example, compensating frequency offset and achieving symbol synchronization between traffic E and traffic F. The electrical signals containing traffic E and traffic F can then be recombined and de-multiplexed by a single process based on the discrete Fourier transform (DFT).

On receipt, the optical signals containing traffic E and traffic F may exhibit a relative difference in polarization status. A difference in polarization status may be due, for example, to the fact that the signals originate from different transmitters and take different paths through the network. The relative difference of polarization status between the optical signals containing traffic E and traffic F does not affect their orthogonality for purposes of OFDM. Thus, polarization de-multiplexing may be processed separately in bands or sub-carrier channels.

Additionally, the signal power per bandwidth can be equalized in the optical domain. For example, in the situation where the optical signals containing traffic E and traffic F are subject to different transmission power and loss, each band may be subjected to a different attenuation applied at the WSS filter.

Figure 5A:
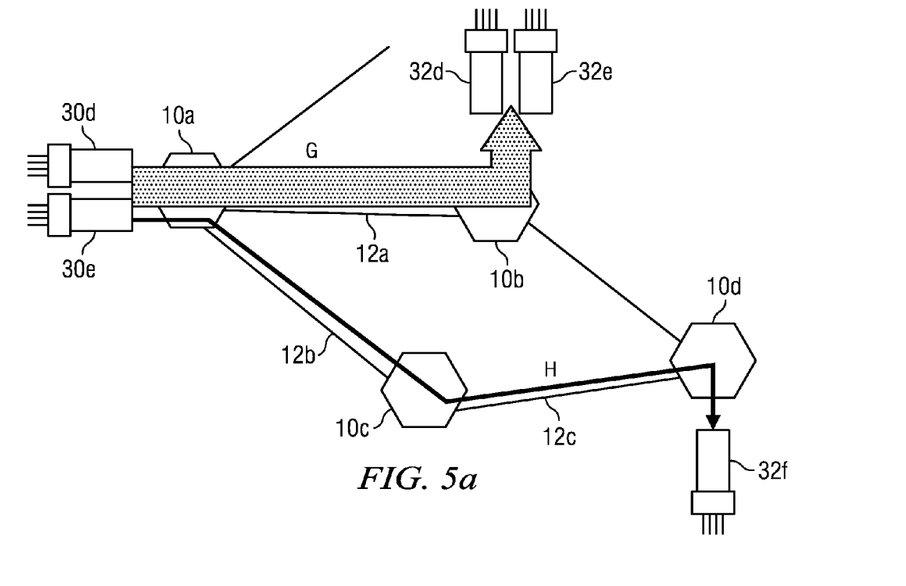
FIGS. 5a and 5b depict transmission of multiple optical orthogonal frequency division multiplexed signals, including at least one super-channel signal, by multiple transmitters according to an embodiment of the present disclosure.
Figure 5B:
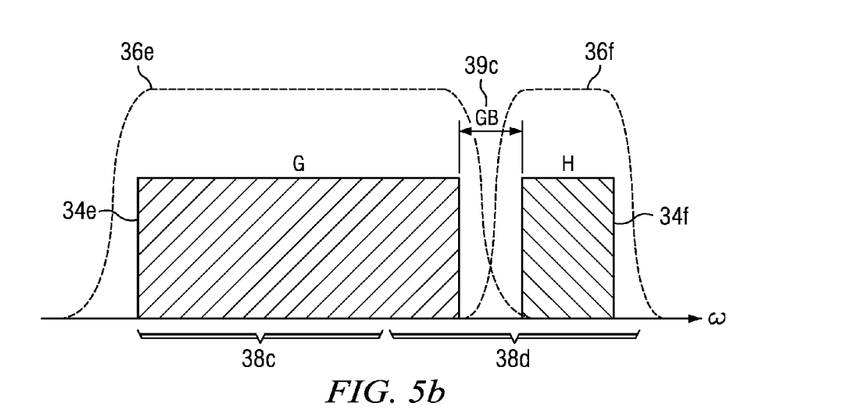

FIGS. 5a and 5b depict transmission of multiple optical OFDM signals, including at least one super-channel signal, by multiple transmitters according to an embodiment of the present disclosure.

FIG. 5a illustrates a single OFDM transmitter 30d that is used to transmit multiple signals, including one super-channel signal, to multiple receivers 32d, 32e, and 32f residing in nodes 10b and 10d. In this embodiment, the bandwidth of traffic G exceeds the bandwidth of either transmitter 30d or 30e of node 10a. A super-channel can be created if transmitters 30d and 30e use carriers that are phase- and frequency-locked, have a synchronized clock, and have the same symbol timing. In that case, transmitters 30d and 30e are both used to transmit portions of the super-channel signal containing traffic G, which has a bandwidth that exceeds the individual transmitter bandwidth. Traffic G is received by receivers 32d and 32e residing in node 10b. While transmitting a portion of traffic G, transmitter 30e also transmits traffic H to receiver 32f residing in node 10d.

FIG. 5b further illustrates the bandwidth 34e of traffic G, which exceeds the respective bandwidths 38c and 38d of transmitters 30d and 30e. To accommodate the transmission of the super-channel signal containing traffic G, traffic G's bandwidth 34e may be allocated across more than one transmitter. In the embodiment of FIGS. 5a and 5b, transmitter 30d dedicates its entire bandwidth to traffic G. The remainder of traffic G is transmitted by transmitter 30e. Because this portion of traffic G does not consume the entire bandwidth of transmitter 30e, it may also transmit traffic H, which has bandwidth 34f and requires only fractional bandwidth of transmitter 30e. The collective bandwidth of traffic G and traffic H, plus a suitable guard-band 39c, is within the combined bandwidths 38c and 38d of the transmitters 30d and 30e. As described above, the width of the guard-band 39c is typically greater than the maximum relative frequency drift between the transmitter laser and the center of the WSS filter bandwidth, plus two times the transition width of the WSS filter characteristics 36e and 36f.

The system of FIG. 5a illustrates numerous advantages of the present disclosure. Transmitter 30e transmits multiple traffics, thus improving the efficiency of network resource allocation. Furthermore, transmitters 30d and 30e together transmit a super-channel signal containing traffic G. Because a super-channel signal may be allocated across two or more transmitters, the network may transmit traffic with bandwidth exceeding that of any single transmitter.

Figure 6A:
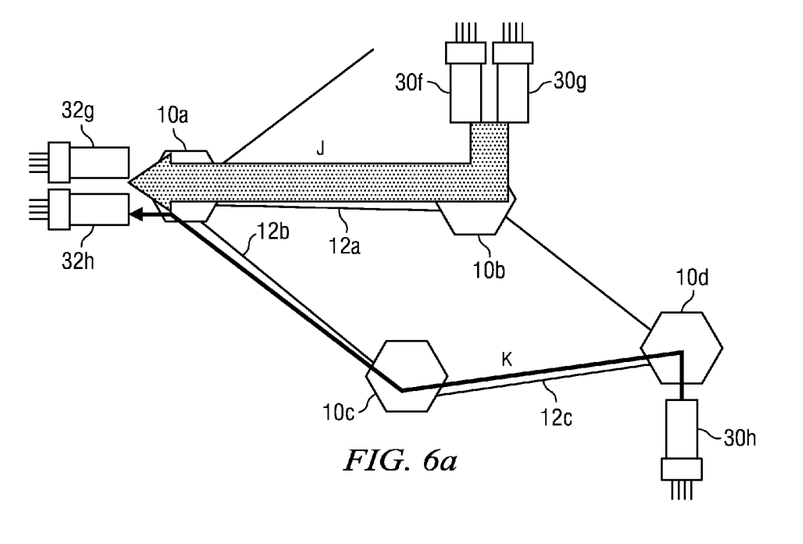
FIGS. 6a and 6b depict reception of multiple optical orthogonal frequency division multiplexed signals, including at least one super-channel signal, by multiple receivers according to an embodiment of the present disclosure.
Figure 6B:
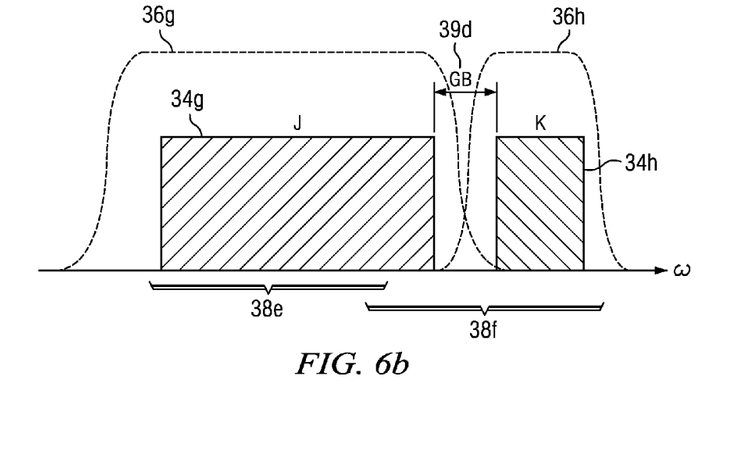

FIGS. 6a and 6b depict reception of multiple optical OFDM signals, including at least one super-channel signal, by multiple receivers according to an embodiment of the present disclosure.

FIG. 6a illustrates a plurality of multi-band, multi-traffic optical OFDM receivers 32g and 32h that are used to receive multiple signals, including one super-channel signal containing traffic J, from multiple transmitters 30f, 30g, and 30h residing in nodes 10b and 10d. In this example, the bandwidth of traffic J, transmitted by transmitters 30f and 30g, exceeds the bandwidth of either receiver 32g or 32h. A super-channel signal can be received if the relative frequency difference of the local oscillators in receivers 32g and 32h is known or, alternatively, if the local oscillators of receivers 32g and 32h are frequency locked. Receivers 32g and 32h may each receive a portion of traffic J. While receiving a portion of traffic J, receiver 32h also receives traffic K from transmitter 30h residing in node 10d. As described above, the width of the guard-band 39*d* is typically greater than the maximum relative frequency drift between the transmitter laser and the center of the WSS filter bandwidth, plus two times the transition width of the WSS filter characteristics 36*g* and 36*h*.

As is further illustrated in FIG. 6*b*, the bandwidth 34*g* of traffic J exceeds the respective bandwidths 38*e* and 38*f* of receivers 32*g* and 32*h*. To accommodate the reception of a super-channel signal containing traffic J, traffic J's bandwidth 34*g* may be allocated across more than one receiver. In the example of FIGS. 6*a* and 6*b*, receiver 32*g* dedicates its entire bandwidth to traffic J. The remainder of traffic J's bandwidth 34*g* is allocated to receiver 32*h*. Because this portion of traffic J does not consume the entire bandwidth of receiver 32*h*, receiver 32*h* may also receive traffic K, which has bandwidth 34*h* and requires only a fraction of receiver 32*h*'s bandwidth.

The collective bandwidth of traffic J and traffic K, plus that of the suitable guard-band 39*d*, is within the combined bandwidths of the receivers 32*g* and 32*h*. The edges of the receiver bandwidths 38*e* and 38*f* may overlap, as illustrated in FIG. 6*b*. In some circumstances, the signal-to-noise ratio (SNR) of sub-carrier channels in the edge of the electrical bandwidth of the receiver may be poor, because of roll-off in the receiver's frequency characteristic. Because attenuation of an OFDM subchannel generally does not affect the orthogonality between subchannels, this poor SNR will generally not introduce channel crosstalk between sub-channels in OFDM. In fact, the overlap of the receiver bandwidths 38*e* and 38*f* can provide redundant information about and, thus, make it easier to recover data in the sub-carrier channels located within the bandwidth overlap.

The receivers illustrated in FIG. 6*a* convey advantages similar to those provided by the transmitters of FIG. 5*a*. For instance, the receivers of FIG. 6*a* may improve the efficiency of network resource allocation.

Figure 7:
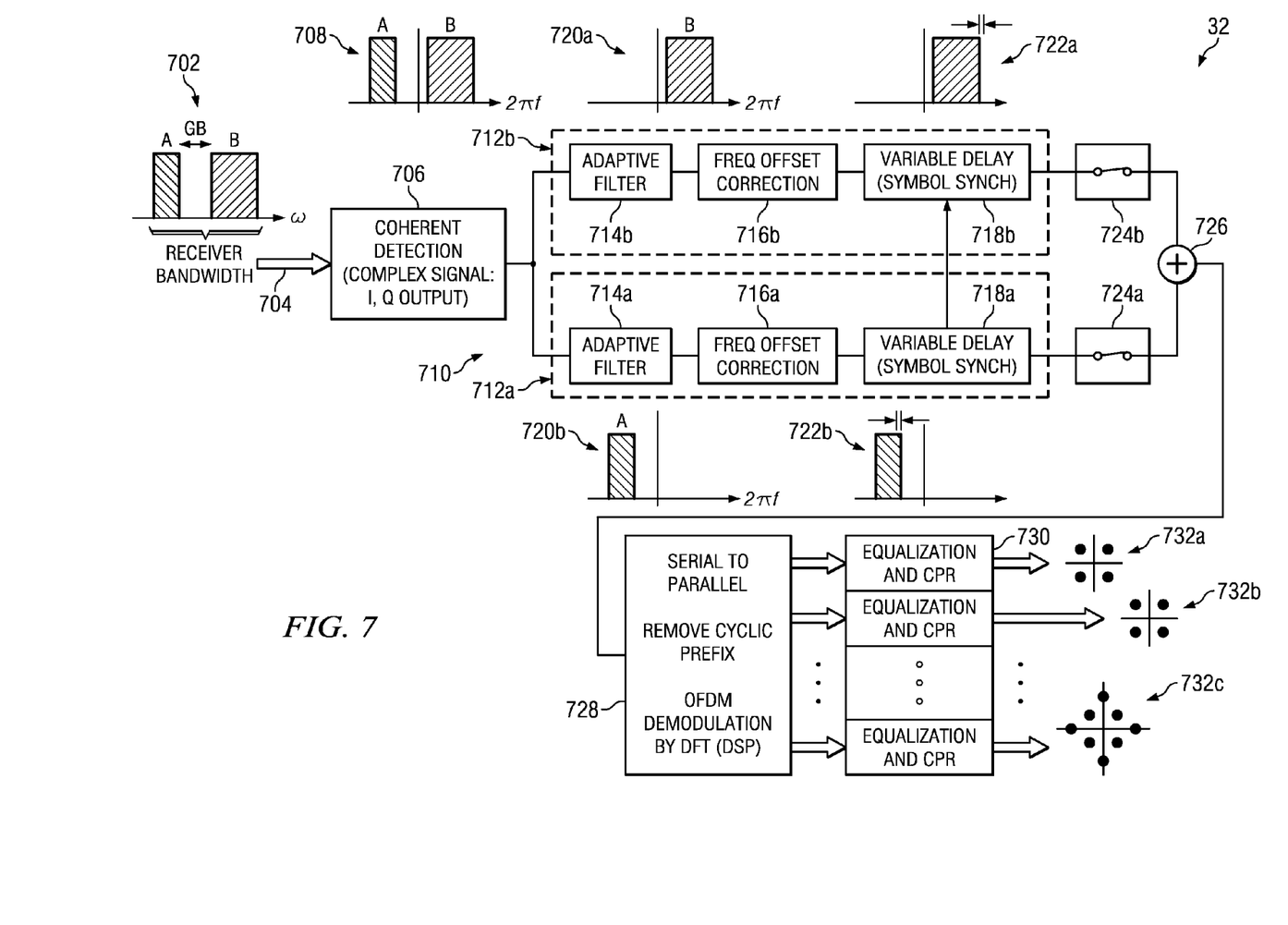
FIG. 7 is a block diagram depicting an apparatus for receiving and processing multiple optical orthogonal frequency division multiplexed signals with one receiver according to an embodiment of the present disclosure.

FIG. 7 is a block diagram depicting an apparatus for receiving and processing multiple traffics with one optical OFDM receiver 32, according to an embodiment of the present disclosure. Receiver 32, which may receive multiple traffics, is an example of the receivers described with respect to FIG. 6*a*. Receiver 32 comprises coherent detector 706, preprocessor 710, on-off modules 724*a* and 724*b*, combiner 726, signal processor 728, and equalization and carrier phase recovery module 730.

The arriving optical OFDM signal 704 has an optical spectrum 702, including traffic bands A and B which are separated by a guard-band GB. Coherent detector 706 receives optical signal 704 and converts it to the electrical domain. The signal output from detector 706 has an RF spectrum characteristic 708 which preserves distinct traffic bands A and B, and may take the form of a complex signal having in-phase and quadrature (i.e. "I" and "Q") components. Coherent detector 706 may employ a direct down-conversion architecture. For example, coherent detector 706 may use a local-oscillator laser, two pairs of balanced receivers, and an optical 90° hybrid to perform I/Q detection. Coherent detector 706 may alternatively employ an intermediate down-conversion architecture. For example, coherent detector 706 may first convert the optical signal to an intermediate frequency, and then perform I/Q detection in the electrical domain. These methods are described in W. Shieh et al., "Coherent optical OFDM: theory and design," *Optics Express*, vol. 16, no. 2, Jan. 21, 2008 and W. Shieh and C. Athaudage, "Coherent optical orthogonal frequency division multiplexing," *Electronics Letters*, vol. 42, no. 10, May 11, 2006.

The signal is then communicated to a preprocessor 710 that includes a plurality of parallel preprocessors 712*a* and 712*b*. Parallel preprocessor 712*a* includes adaptive filter 714*a*, frequency offset correction module 716*a*, and variable delay symbol synchronization module 718*a*. Similarly, parallel preprocessor 712*b* includes adaptive filter 714*b*, frequency offset correction module 716*b*, and variable delay symbol synchronization module 718*b*.

Adaptive filter 714*a* adjusts to pass the band for traffic A and reject other signal bands. Adaptive filter 714*a* may operate as a passband filter in which the low- and high-frequency cutoffs are adaptively adjustable. For example, adaptive filter 714*a* may be implemented in a digital signal processor and may employ feedback in the form of an error or cost function to adjust the filter response function, according to an implementation such as a least mean squares or recursive least squares. The electrical signal containing traffic A then passes to frequency offset correction module 716*a*, which compensates for frequency offset due to the frequency mismatch between the transmitter laser and the local-oscillator laser. Such offset may be due, for example, to random drift of the laser frequency. The frequency offset may be compensated, for example, by transmitting a pilot tone that includes information about its carrier frequency. By comparing the received frequency of the pilot tone to the known carrier frequency to determine a frequency difference $\Delta f$ (the amount by which the received frequency exceeds the known carrier frequency) and multiplying received signal by an exponential, $e^{-2\pi i \Delta f}$, the frequency offset correction module 716*a* may compensate for the frequency drift. Frequency compensation module 716*a* may alternatively employ a training signal or other suitable method to compensate for frequency drift. After compensation of frequency offset, the signal containing traffic A proceeds to variable delay symbol synchronization module 718*a*.

Similarly, adaptive filter 714*b* adjusts to pass the band for traffic B and reject other signal bands. The signal containing traffic B then passes to frequency offset correction module 716*b*, which compensates for frequency offset. After compensation of frequency offset, the signal containing traffic B proceeds to variable delay symbol synchronization module 718*b*.

Variable delay symbol synchronization modules 718*a* and 718*b* act to synchronize the OFDM symbol period of later-arriving traffic to that of existing traffic in the receiver. When a traffic, such as traffic A, arrives at a time when no other traffic is currently being processed, the variable delay symbol synchronization module 718*a* obtains information about the symbol timing, such as when the symbol starts, in the arriving traffic. If traffic B arrives at a later time while the receiver is still processing the signal containing traffic A, symbol synchronization module 718*b* will synchronize the symbol timing of traffic B to that of traffic A. This synchronization may be done, for example, by transmission of a training signal with a known pattern. The training signal may be sent periodically and interspersed with actual data. Symbol synchronization modules 718*a* and 718*b* may determine on the basis of the received trainings signals whether a relative delay exists between the symbol timing of traffic A and that of traffic B. If a relative delay exists, symbol synchronization modules 718*a* and 718*b* may apply a suitable delay to one or more traffics by use of a buffer or other suitable delay mechanism to synchronize the traffics' symbol timing. For example, if traffic A arrives before traffic B and, if symbol synchronization modules 718*a* and 718*b* determine that a relative delay exists between the symbol timing of traffics A and B, symbol synchronization module 718*b* may delay traffic B until its symbol timing aligns with traffic A. In this process, the traffic A will not be interrupted by traffic B.

To use a single transmitter or receiver for multiple traffic, clock synchronization between traffic going to different destinations or coming from different sources may be required. One possible approach to achieve this synchronization is to distribute the clock in the network. Another possibility is to synchronize the clock of any new traffic to the clock of the existing traffic on the desired transmitter/receiver, assuming the traffic is bi-directional. The new traffic may use a synchronization signal for this purpose when it is establishing connections. In this case, new traffic between transponders serving other traffic may not be established if the transponders have different clock references. The new traffic may then be established using other available transmitters/receivers.

Figure 9:
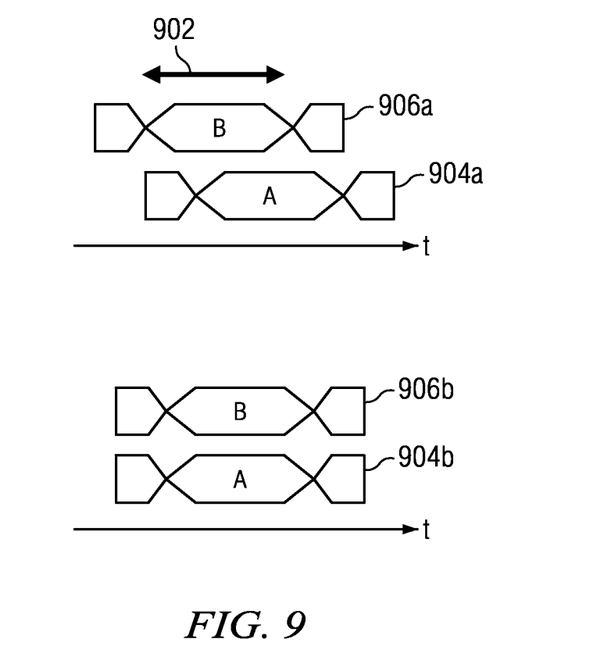
FIG. 9 depicts symbol synchronization of multiple optical orthogonal frequency division multiplexed signals.

FIG. 9 depicts symbol synchronization of multiple OFDM traffics according to an embodiment of the present disclosure. Prior to symbol synchronization, traffic A 904a and traffic B 906a, each having period 902, are not synchronized. Following synchronization, traffic A 904b and traffic B 906b are synchronized.

Referring back to FIG. 7, the signal containing traffic A proceeds from variable delay symbol synchronization module 718a to on-off module 724a. On-off module 724a allows preprocessed traffic to pass, while preventing noise from an inactive parallel preprocessor branch from corrupting the data. On-off module 724a may be implemented in one of many possible ways. For example, on-off module 724a may be implemented digitally as a "multiply by zero" operation. In this example, on-off module 724a would multiply by zero any data output from preprocessor 712a at times when preprocessor 712a is not actively preprocessing a traffic, and would not modify data output from preprocessor 712a at times when preprocessor 712a is actively preprocessing a traffic. Alternatively, on-off module 724a could be implemented as an analog switch. The function of on-off module 724a could alternatively be implemented by filtering noise from an inactive parallel preprocessor branch. Similarly, the signal containing traffic B proceeds from variable delay symbol synchronization module 718b to on-off module 724b.

Combiner 726 then combines the outputs of on-off modules 724a and 724b. Combiner 726 may take the form of, for example, an adder and may be implemented digitally or in analog circuitry. The combined signal output from combiner 726 is communicated to processor 728.

Processor 728 performs other processing steps, including converting the signal from serial format to parallel format, removing the OFDM cyclic prefix, and demodulating the signals by use of the discrete Fourier transform (DFT). The demodulation may be done by use of a fast algorithm such as the Fast Fourier Transform (FFT). Because OFDM signals may be demodulated via the efficient FFT algorithm, their use substantially increases the signal processing speed compared to other forms of signal de-multiplexing.

After undergoing processing by processor 728, the signal proceeds to equalization and carrier phase recovery ("CPR") module 730. Equalization and CPR module 730 compensates for the relative phase shift between subcarriers, which phase shift may be caused by optical dispersion in the network, and carrier phase noise due to the transmit and laser phase noise in the OFDM signal. Equalization and CPR may be accomplished by known methods, some of which are discussed in W. Shieh et al., "Coherent optical OFDM: has its time come?" *Journal of Optical Networking*, vol. 7, no. 3 at pp. 234-255 (March 2008). For example, zero forcing estimation, which involves comparing a received pilot signal (or a series of periodically-sent pilot signals) to the known subcarriers of the transmitted pilot signal to extract the channel transfer function for each subcarrier, may be used to compensate relative phase shift between subcarriers. Pilot tones and maximum likelihood carrier phase estimation can be used to compensate for the remaining phase noise.

Signal data 732a, 732b, and 732c are output from equalization and CPR module 730. The signal data may represent data modulated according to any number of known modulation techniques. In this embodiment, data 732a, 732b, and 732c have been modulated according to a quadrature amplitude modulation ("QAM") technique.

While FIG. 7 illustrates a receiver capable of receiving and processing two incoming traffic bands, the invention is not limited to only two traffic bands. One of skill in the art will recognize that the disclosed receiver of FIG. 7 is extendable to more than two traffic bands.

Figure 8:
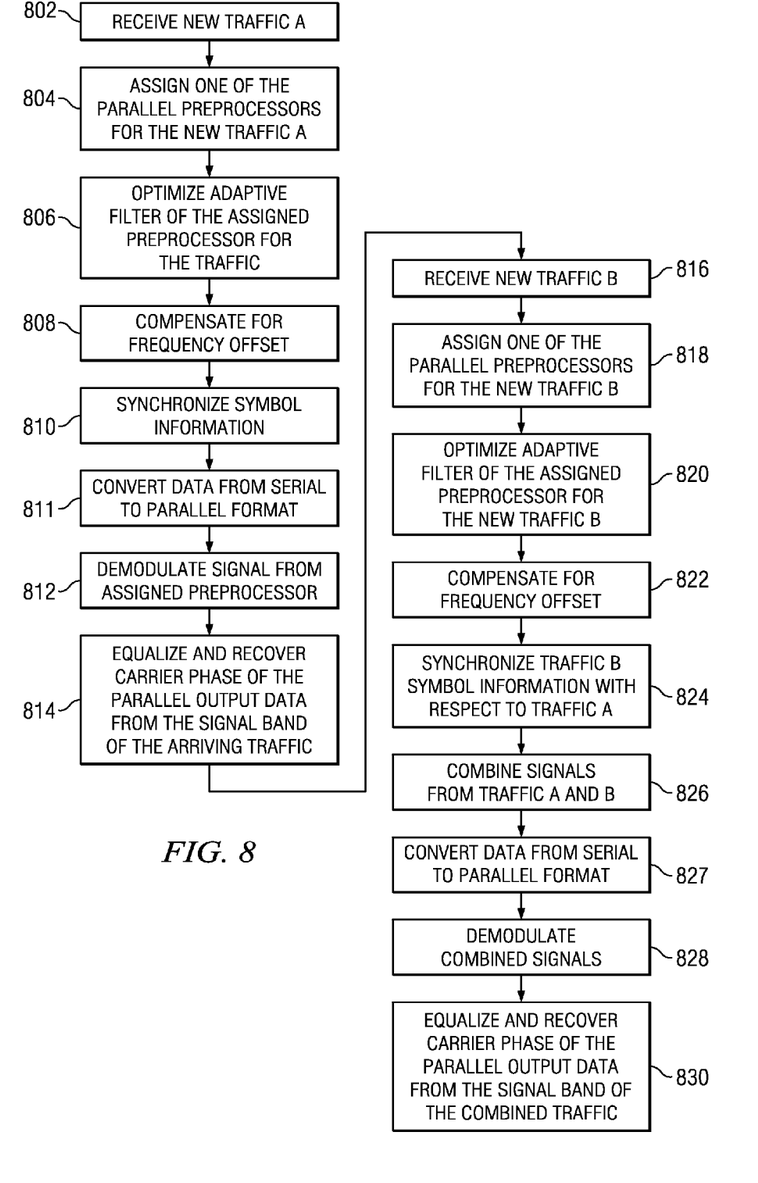
FIG. 8 is a flowchart depicting the procedure for receiving and processing multiple optical orthogonal frequency division multiplexed signals with one receiver according to an embodiment of the present disclosure.

FIG. 8 is a flowchart depicting the procedure for receiving and processing OFDM signals containing multiple traffics with one receiver according to the embodiment of FIG. 7. In step 802, a new signal traffic arrives at the receiver. The new signal traffic may be, for example, the signal traffic A illustrated in FIG. 7. In some cases, the receiver may not be processing any traffic immediately prior to step 802. In step 804, one of a plurality of parallel preprocessors is assigned for the new signal traffic. In step 806, an adaptive filter of the assigned preprocessor is optimized for the traffic. The optimization may involve setting the passband of the filter to allow the signal band of the assigned traffic to pass, while rejecting signals in other bands.

Step 808 compensates for frequency offset in the signal containing the assigned traffic A. Frequency offset may be caused by random frequency drift of the transmitter laser and local-oscillator laser. Known methods may be used to compensate for frequency offset. For example, step 808 may compensate for frequency offset by reception of a suitable pilot tone, as discussed in more detail with respect to FIG. 7.

In step 810, information about the assigned traffic's symbol timing is obtained. As described in more detail with respect to FIG. 7, step 810 may involve obtaining information about the start timing of the traffic's symbol. This may be done, for example, by means of a training signal.

In step 811, traffic A is converted from serial format to parallel format. Next, in step 812, the signal containing traffic A is demodulated to extract traffic information from the modulated carrier signal. Demodulation may be achieved by means of the discrete Fourier Transform (DFT) or, more specifically, the Fast Fourier Transform (FFT) after removing the cyclic prefix. The ability to demodulate signals using the computationally-efficient FFT is a significant advantage of OFDM when compared to other multiplexing techniques.

In 814, equalization and carrier phase recovery are carried out on the parallel output data from the signal band of the traffic, as described in more detail with respect to FIG. 7.

In step 816, a new traffic arrives during the time that the receiver is receiving and processing traffic A. This new traffic may, for example, correspond to signal traffic B as illustrated in FIG. 7. Typically, the signal band of the later-arriving traffic does not overlap the signal band of the earlier-arriving traffic.

In step 818, traffic B is assigned to a parallel preprocessor that is not currently preprocessing another traffic. Steps 818 and 820 are similar to steps 806 and 808. In step 820, the adaptive filter of the preprocessor assigned to traffic B is optimized for the traffic. Step 822 compensates for frequency offset in the signal containing traffic B.

In step 824, traffic B is symbol-synchronized with respect to the previously-existing signal traffic. As described with respect to FIG. 7, symbol synchronization may use a training signal to determine the traffics' respective symbol timings and may involve delaying one traffic with respect to the other to align the relative symbol timing.

After the preprocessing, step 826 combines the signals containing traffic A and traffic B from the working preprocessors. Step 826 may be performed by any suitable signal combiner, such as by a digital addition operation or an analog adder. In step 827, the traffic is converted from serial format to parallel format. Next, in step 828, the combined signal is converted to parallel data before demodulation. As in step 812, the demodulation may be performed by means of a DFT or FFT after removing cyclic prefix.

In step 830, equalization and carrier phase recovery are carried out on the parallel output data from the signal band of the combined traffic.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. An apparatus for receiving an optical orthogonal frequency-division multiplexed signal containing a plurality of traffics wherein the traffics are separated from adjacent traffics by a guard band, said apparatus comprising:
   a coherent optical detector configured to convert the optical orthogonal frequency-division multiplexed signal into an electrical orthogonal frequency-division multiplexed signal;
   a plurality of parallel preprocessors, each configured to preprocess a portion of the electrical orthogonal frequency-division multiplexed signal containing one of the plurality of traffics;
   a signal combiner configured to combine the preprocessed portions of the electrical orthogonal frequency-division multiplexed signals;
   a processor configured to process the combined preprocessed portions of the electrical orthogonal frequency-division multiplexed signal; and
   an equalization and carrier phase recovery module configured to compensate for a relative phase shift between the preprocessed, combined and processed portions of the electrical orthogonal frequency-division multiplexed signals.

2. The apparatus of claim 1, wherein each of the plurality of preprocessors further comprises:
   an adaptive filter configured to substantially pass a portion of the electrical orthogonal frequency-division multiplexed signal containing one of the plurality of traffics while substantially rejecting other portions of the electrical orthogonal frequency-division multiplexed signal;
   a frequency offset module configured to compensate for drift in the carrier frequency of the portion of the electrical orthogonal frequency-division multiplexed signal passed by the adaptive filter; and
   a variable delay symbol synchronization module configured to synchronize the symbol timing of the plurality of traffics.

3. The apparatus of claim 2, wherein the processor is further configured to convert the plurality of traffics from serial format to parallel format.

4. The apparatus of claim 3, wherein the processor is further configured to demodulate the combined preprocessed electrical orthogonal frequency-division multiplexed signals.

5. The apparatus of claim 4, wherein the processor is further configured to demodulate the combined preprocessed electrical orthogonal frequency-division multiplexed signals by means of a discrete Fourier transform.

6. The apparatus of claim 5, wherein the discrete Fourier transform is a Fast Fourier Transform.

7. The apparatus of claim 6, wherein the processor is further configured to remove an orthogonal frequency-division multiplexing cyclic prefix from the combined preprocessed portions of the electrical orthogonal frequency-division multiplexed signal.

8. A method of receiving and processing an optical orthogonal frequency-division multiplexed signal containing a plurality of traffics wherein the traffics are separated from adjacent traffics by a guard band, said method comprising the steps of:
   receiving the optical orthogonal frequency-division multiplexed signal;
   down-converting the optical orthogonal frequency-division multiplexed signal into the electrical domain to obtain an electrical signal;
   filtering the electrical signal to obtain a first portion of the electrical signal containing a first of the plurality of traffics;
   preprocessing the first portion of the electrical signal in a first parallel preprocessor;
   filtering the electrical signal to obtain a second portion of the electrical signal containing a second of the plurality of traffics;
   preprocessing the second portion of the electrical signal in a second parallel preprocessor;
   combining the preprocessed first portion of the electrical signal and the preprocessed second portion of the electrical signal to yield a combined electrical signal;
   demodulating the combined electrical signal; and
   after demodulating the combined electrical signal, compensating for a relative phase shift between the preprocessed and combined first and second portions of the electrical signal using an equalization and carrier phase recovery module.

9. The method of claim 8, wherein the step of preprocessing the first portion of the electrical signal further comprises compensating for frequency offset in the first portion of the electrical signal and the step of preprocessing the second portion of the electrical signal further comprises compensating for frequency offset in the second portion of the electrical signal.

10. The method of claim 9, wherein the step of preprocessing the first portion of the electrical signal further comprises obtaining symbol synchronization information about the first of the plurality of traffics.

11. The method of claim 10, wherein the step of preprocessing the second portion of the electrical signal further comprises synchronizing the symbol timing of the second of the plurality of traffics to the symbol timing of the first of the plurality of traffics.

12. The method of claim 11, wherein the step of demodulating the combined electrical signal comprises subjecting the combined electrical signal to a discrete Fourier transform.

13. The method of claim 12, wherein the discrete Fourier transform is accomplished using a Fast Fourier Transform algorithm.

14. A method of receiving and processing an optical orthogonal frequency-division multiplexed signal containing a plurality of traffics wherein the traffics are separated from adjacent traffics by a guard band, said method comprising the steps of:
   receiving the optical orthogonal frequency-division multiplexed signal;

down-converting the optical orthogonal frequency-division multiplexed signal into the electrical domain to obtain an electrical signal;

filtering the electrical signal to obtain a plurality of portions of the electrical signal, each portion containing one of the plurality of traffics;

preprocessing each portion of the electrical signal in one of a plurality of parallel preprocessors;

combining the preprocessed portions of the electrical signal to yield a combined electrical signal;

demodulating the combined electrical signal; and after demodulating the combined electrical signal, compensating for a relative phase shift between the preprocessed and combined first and second portions of the electrical signal using an equalization and carrier phase recovery module.

* * * * *